United States Patent [19]
Ohara

[11] Patent Number: 5,495,472
[45] Date of Patent: Feb. 27, 1996

[54] METHODS AND APPARATUS FOR UTILIZING PROTECTION PATHS AS ADDITIONAL WORKING PATHS IN SWITCHED RING NETWORK SYSTEMS

[75] Inventor: Katsuichi Ohara, Kawasaki, Japan

[73] Assignee: Fujitsu Limited, Kawasaki, Japan

[21] Appl. No.: 215,378

[22] Filed: Mar. 21, 1994

[30] Foreign Application Priority Data

Sep. 20, 1993 [JP] Japan ................................ 5-257582

[51] Int. Cl.$^6$ ....................................... H04L 1/22
[52] U.S. Cl. ..................... 370/16.1; 370/85.12; 371/20.1
[58] Field of Search .................. 340/825.01; 371/8.2, 371/11.1, 68.2; 455/8, 52.1; 375/38; 370/16, 16.1, 85.6, 85.9, 85.12, 68.1

[56] References Cited

U.S. PATENT DOCUMENTS

| | | | |
|---|---|---|---|
| 4,648,088 | 3/1987 | Cagle et al. | 370/16.1 |
| 5,003,531 | 3/1991 | Farinholt | 370/16.1 |
| 5,150,356 | 9/1992 | Tsutsui | 370/16.1 |
| 5,241,534 | 8/1993 | Omuro et al. | 455/8 |
| 5,329,520 | 7/1994 | Richardson | 371/8.2 |

FOREIGN PATENT DOCUMENTS

| | | |
|---|---|---|
| 2152789 | 8/1985 | United Kingdom. |
| 2172175 | 9/1986 | United Kingdom. |

OTHER PUBLICATIONS

International Publication No. WO 93/00756, published Jan. 7, 1993.
International Publication No. WO 92/04787, published Mar. 19, 1992.

Primary Examiner—Benedict V. Safourek
Attorney, Agent, or Firm—Greer, Burns & Crain, Ltd.

[57] ABSTRACT

A path select switching unit is installed in network elements that are interconnected to make up a ring network. A path select switching unit has a path protection switched ring mode in which a first cross-connect uses a working path and a protection path which are counter-rotating paths set up on a line in the network. A re-use mode is also provided in which a second cross-connect is adapted for re-use of the protection path as a second working path for a different signal on that line. The path select switching unit in each network element detects a failure in the working path and, when a failure occurs, switches from the second cross-connect to the first cross-connect so as to force the path protection switched ring mode to be established, allowing data transmission over the protection path on the line.

8 Claims, 5 Drawing Sheets

---→ MAIN-LINE PATH
---→ SUB-LINE PATH

METHODS AND APPARATUS FOR UTILIZING PROTECTION PATHS AS ADDITIONAL WORKING PATHS IN SWITCHED RING NETWORK SYSTEMS

BACKGROUND OF THE INVENTION

1. Field of the Invention

The present invention relates to a switched ring network system having a path protection, with a self-adjusting facility for recovering from failures in the network, and more specifically, to a path protection switched ring network system and a method of recovery from a failure in the network that provides effective recovery from a failure in a currently used path, i.e., a working path, even when a protection path is being used as an additional working path when the failure occurs.

2. Description of the Related Art

In recent years, standardized multiplex transmission-based digital synchronous networks have been proposed such as SONET (Synchronous Optical Network), which is the standard system of North America, and SDH (Synchronous Digital Hierarchy), which is the international standard system of ITU-T (International Telecommunication Union—Telecommunication Standardization Sector). One feature of such systems is that data is always arranged in a predetermined manner. For example, allocations are made for the transmission of "overhead" information used to operate the network.

In forming a ring, a synchronous network can include a path protection switched ring (hereinafter referred to as a PPS ring). In the PPS ring, a primary working path, which is a path currently being used, and a protection path are used as counter-rotating transmission paths having identical assigned time slots. In the event of a failure in the primary working path, the PPS ring switches from the primary working path to the protection path to thereby ensure the protection of the signals on the line.

If there is no failure in the working path, then both the working path and the protection path will transmit identical signals. Practically, this results in a waste of the protection path. In order to utilize the protection path effectively, therefore, a re-use system is often provided in which the protection path is used as an additional working path, to transmit a sub-signal different from the main signal being transmitted over the primary working path. During re-use, the signal on the protection path is not identical to that on the primary working path, which differs from the typical PPS ring arrangement. That is, there is no protection in the working path. This is a problem because the main signal on the primary working path needs to be saved in the event of a network failure.

In the PPS ring, a plurality of network elements are interconnected in a ring configuration by a primary working path and a protection path which are set up to transmit signals, for example, in a clockwise direction and in a counterclockwise direction, respectively, to thereby form a dual-ring configuration. Identical time slots are assigned to both the primary working path and the protection path for signal transmission. Suppose that, in transmitting data from one network element to any other network element, for example, a clockwise working path and a counterclockwise protection path are formed between the transmitting network element and the receiving network element. In this case, the receiving network element normally receives data via the clockwise primary working path. When degradation due to a failure or the like occurs in the primary working path, on the other hand, switching from the primary working path to the protection path is made so that the receiving element can receive data being sent via the counterclockwise protection path. In this manner, signal transmission is always made via a path which is better in quality. In this case, however, the transmitting network element must transmit the same data on both the working path and the protection path. Thus, the number of actually available paths will be reduced to half of the number of actually existing paths on the ring.

It is the re-use system for such a ring configuration that takes a protection path that is not in actual use and communicates some other signal (subsignal) between network elements over the protection path, using the protection path as a working path for the other signal. Under these conditions, self-adjusting of the main signal on the primary working path to the protection path is impossible because the protection path is unavailable.

However, even when the protection path is used as a second working path, it is desirable to be able to protect the signal on the main line.

SUMMARY OF THE INVENTION

It is therefore an object of the present invention to provide a PPS ring network which, in the event of a working path failure, permits proper cross-connections to be set up in network elements for automatic healing of a signal path by re-routing the signal on a failed working path to a protection path which is then in use as a second working path carrying a different signal.

The PPS ring network system of the present invention is configured to permit network elements to make switching between a cross-connect for a normal protection path and a cross-connect for a sub-line or second working path. In the event of a primary working path failure, a network element that detected the failure transfers failure information to the other elements. Relevant network elements set a proper cross-connect, thereby permitting self-healing of the signal path and successful transmission of the signal.

More specifically, the PPS ring network of the present invention is provided with a plurality of network elements that are interconnected in a ring configuration. Each of the network elements is equipped with a switching unit adapted to select between working and protection paths on the basis of switching between cross-connects. Each switching unit has a PPS ring mode in which a first cross-connect to configure a PPS ring that uses counter-rotating working and protection paths may be set up on a line, and a re-use mode in which a second cross-connect for re-use of the protection path as a second working path for a different signal may be set up on the line. The switching unit can detect a failure in the working path of that line and, upon detecting a failure, switches to the first cross-connect in order to force the PPS ring mode to be set, thereby allowing data transmission over the protection path. The failure information may be transmitted to each network element through the use of overhead data provided in standard communication systems. The switching unit may be provided with registers for storing the first and second cross-connect information.

The PPS ring network system of the present invention is configured such that, when a failure has occurred in a primary working path, failure information is transferred from a failure-detecting network element to other network elements, and relevant network elements set up the proper cross-connect. This permits the effective use of a protection path for re-use as a second working path for a different signal when there is no failure in the working path. In the event of a failure in the primary working path, automatic recovery from the failure is permitted by bypassing the failed primary working path by using the protection path.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

Before describing the preferred embodiments of a PPS ring network system of the present invention, a PPS ring system and the re-use of a protection path in the PPS ring will be described first.

Figure 1:
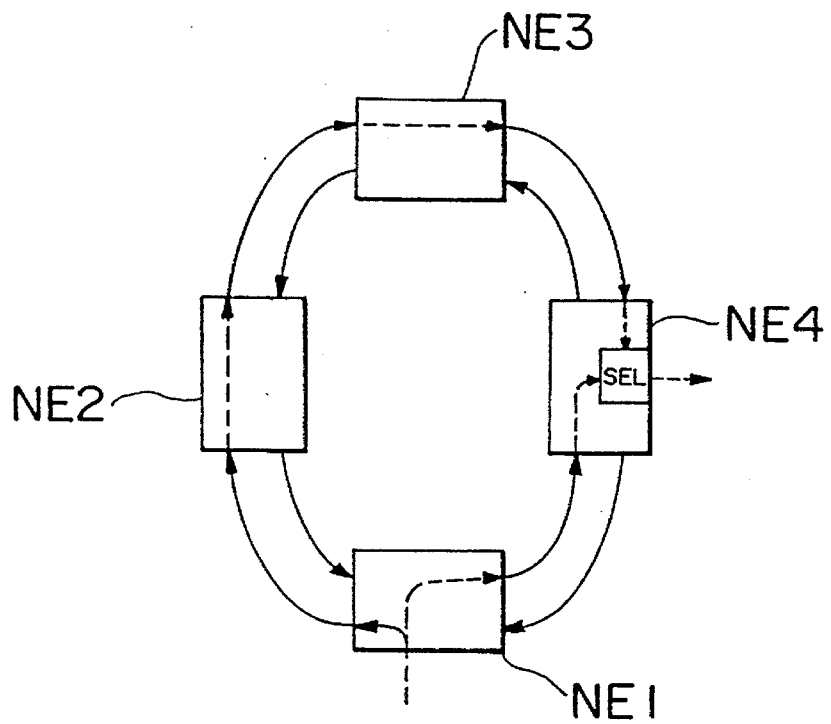
FIG. 1 is a block diagram of an example of a PPS ring network to which the present invention is applied.

A PPS ring is configured, as shown in FIG. 1, such that a plurality of network elements NE1 to NE4 are interconnected in a ring configuration by a primary working path and a protection path, which are respectively adapted to transmit signals, for example, in a clockwise direction and in a counterclockwise direction using identical time slots. Each of the network elements NE1 to NE4 may be an ADM (add-drop multiplex) device.

Suppose now that data transmission is made from network element NE1 to network element NE4. Then, the receiving network NE4 will normally receive data via the route extending from NE1 through NE2 and NE3 to NE4 on the working path in the clockwise direction. When a degradation due to a failure or the like occurs in the working path, the receiving path is switched from the working path to the protection path, so that the receiving element NE4 receives data via the route from NE1 to NE4 on the protection path in the counterclockwise direction. That is, the PPS ring system constantly makes signal transmission via a path that is better in quality. In this case, the transmitting network element NE1 has to transmit the same data on both the protection path and the working path. This means that only half of the paths existing in the ring system are actually available.

Figure 2:
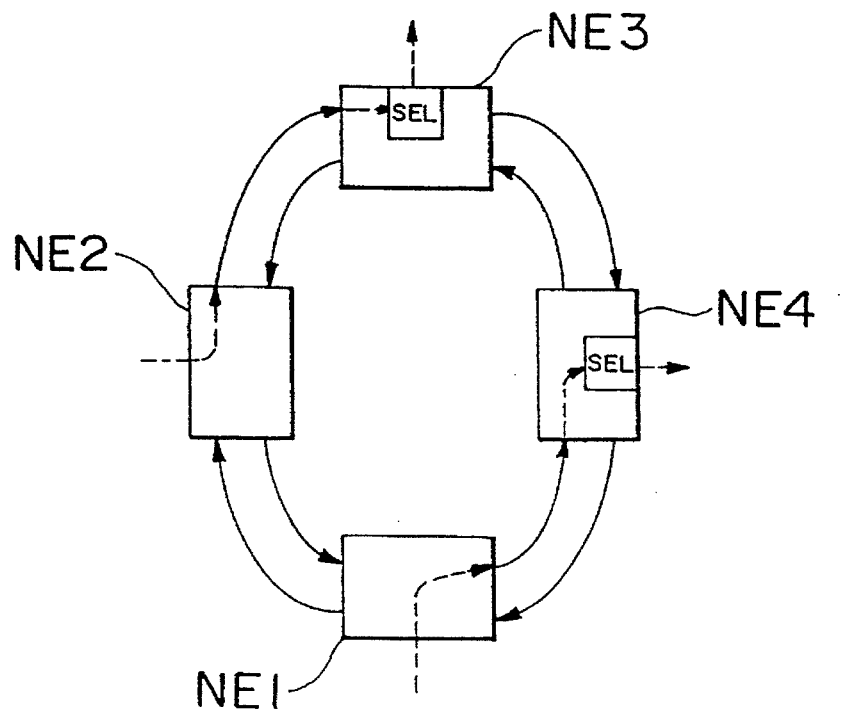
FIG. 2 is a block diagram for use in explanation of re-use in the PPS ring network of FIG. 1.

In such a ring configuration, it is the re-use system that, as shown in FIG. 2, uses the protection path that is not actually in use and utilizes this protection path to make another signal transmission, for example, from network element NE1 to network element NE4. At that time, self-adjusting of the signal path to the line corresponding to the re-used protection path is impossible.

In order to make possible the self-adjusting of the working path for at least a main line, even where more than half of the paths of the PPS ring are utilized for reuse, the protection path utilized as a sub-line must be disconnected and reconfigured to the original protection path for path protection switching when a working path used as the main line is degraded and the protection path is being used as a second working path.

The preferred embodiments of a PPS ring network system of the present invention based on such a principle will be described hereinafter.

Figure 3:
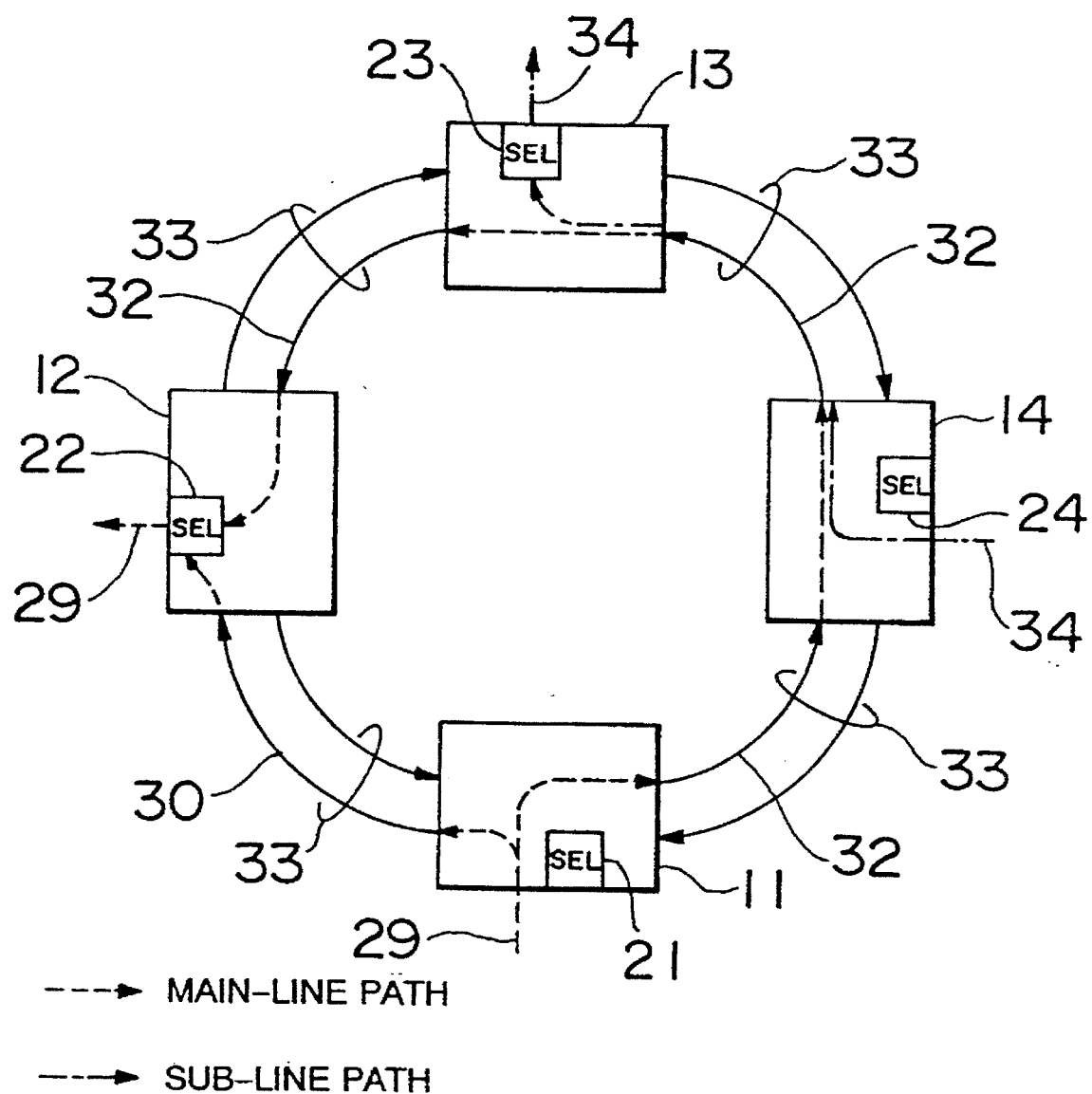
FIG. 3 is a block diagram of a PPS ring network according to a first embodiment of the present invention.

Referring to FIG. 3, there is illustrated a first embodiment of the PPS ring system of the present invention.

A PPS ring system shown in FIG. 3 is provided with, for example, four network elements 11, 12, 13 and 14 interconnected in a ring configuration. The network elements 11, 12, 13 and 14 are equipped with cross-connect path select switching units 21, 22, 23 and 24, respectively.

The path select switching devices 21, 22, 23 and 24 each have a PPS ring mode and a re-use mode. In the PPS ring mode, a first cross-connect 29 for configuring a PPS ring that uses a clockwise working path 30 and a counterclockwise protection path 32 is set up on a set of lines 33. In the re-use mode, on the other hand, a second cross-connect 34 for the re-use of the protection path 32 is set up on the portion of the line 33 between the network elements 14 and 13.

Further, each of the pass select switching devices 21, 22, 23 and 24 detects a failure in the working path 30 in the line 33 and, at the time of the occurrence of a failure, switches from the second cross-connect 34 to the first cross-connect 29 so as to force the PPS ring mode to be set, thereby permitting data transmission via the protection path 32. Each of the network elements is notified of that failure through overhead of transmitted data.

In the PPS ring system of FIG. 3, for example, main line information is transmitted using the route from network element 11 to network element 12 as the working path 30 and the route from network element 11 through network elements 14, 13 to network element 12 as the protection path 32, and sub-line information during re-use is transmitted from network element 14 to network element 13 using a portion of the protection path 32. The above-mentioned overhead information is transmitted between every network element. In the event of a main line failure, information indicative of the occurrence of the failure is sent to network elements 11, 12, 13, and 14 through overhead information, so that the re-use sub-line is disconnected by the switching devices 21, 22, 23, and 24, allowing the protection path 32 to function as it was intended originally.

In the PPS ring system of FIG. 3, the switching devices 21, 22, 23 and 24 in the network elements 11, 12, 13 and 14 allow switching between the first cross-connect for the normal protection path and the second cross-connect for operation as a second working path, and set up the proper cross-connect in the event of a working path failure. This allows automatic adjustment of the signal path from the failing working path to the protection path, even though the protection path was in use as a second working path.

That is, the PPS ring system of FIG. 3 can use the protection path as a second working path for a second signal when the working path is normal (re-use mode) and bypass the primary working path by using the protection path when the former fails, allowing the self-adjustment of the ring.

Thus, the ring can be used effectively by allowing a main line signal to flow into a path based on the first cross-connect information, and a low-priority sub-line signal to flow based on the second cross-connect information.

Figure 4:
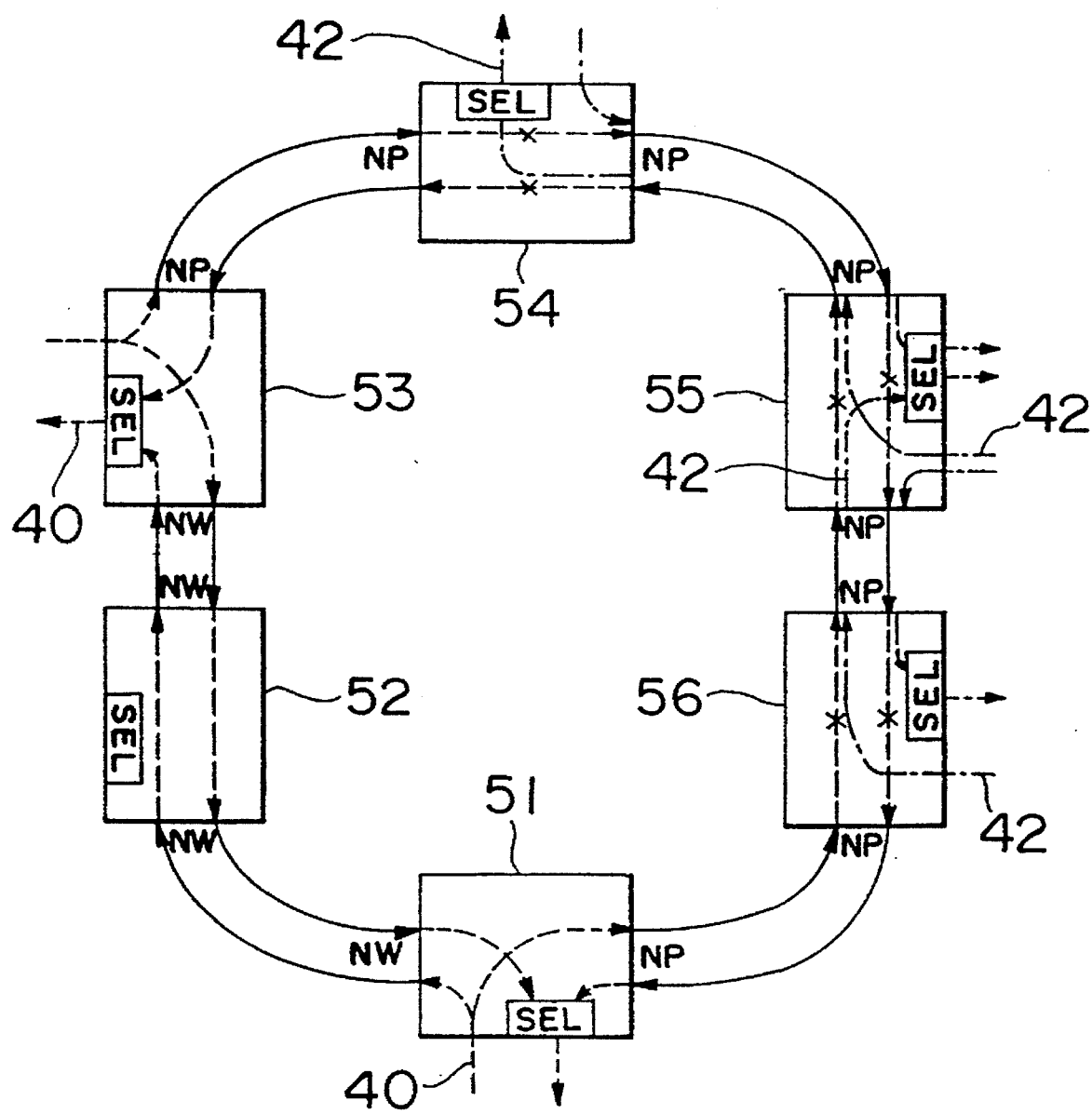
FIG. 4 is a block diagram of a PPS ring network according to a second embodiment of the present invention.

Referring now to FIG. 4, there is illustrated a more specific second embodiment of the PPS ring system according to the present invention.

Figure 5:
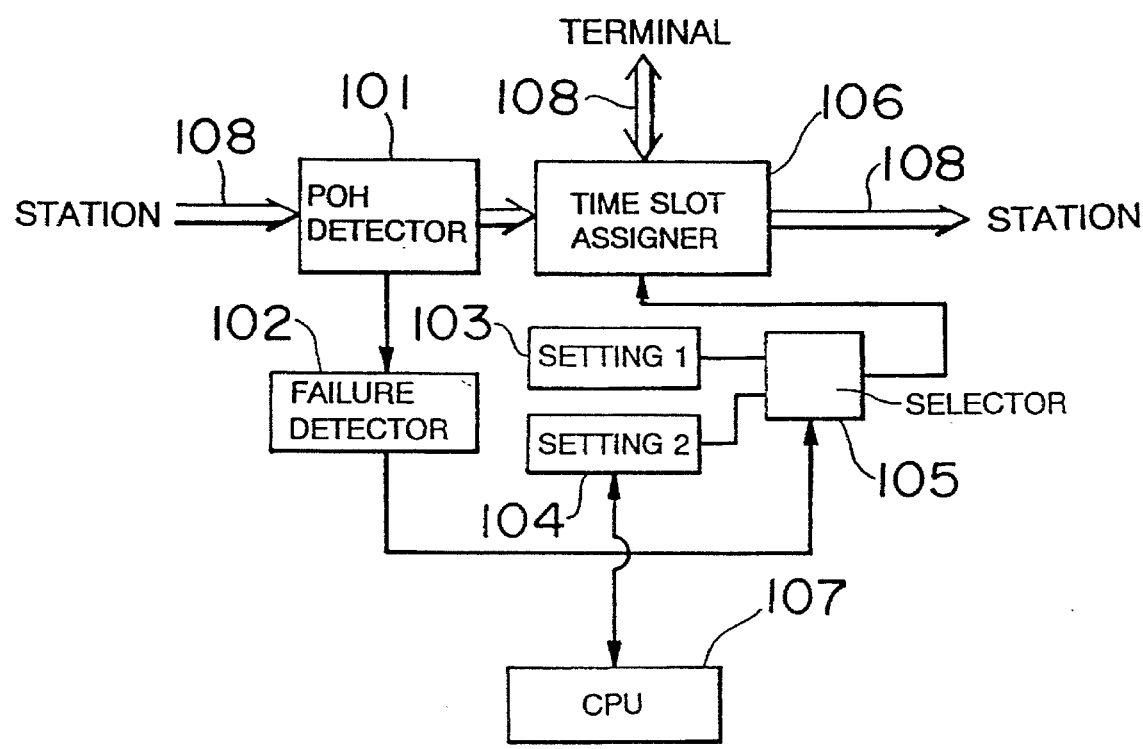
FIG. 5 is a block diagram of the main portion of a network element used in the PPS ring network of FIG. 4.

The PPS ring network system of FIG. 4 is equipped with six stations 51, 52, 53, 54, 55 and 56 which are interconnected in a ring configuration in much the same way as in FIG. 3. Each of these stations 51 to 56 has the same arrangement, and their main portion is constructed as shown in FIG. 5.

A network element constituting a station includes a path overhead (POH) detector 101, a failure detector 102, a first register 103, a second register 104, a selector 105, and a time slot assigner 106. Data signal 108 passes through the POH 101 and time slot assigner 106 as shown.

The failure detector 102 detects any failure in the network on the basis of a path overhead byte including failure information which is detected by the path overhead detector 101 from a main signal from another station on the ring. The first register 103 holds first cross-connect information for PPS ring, while the second register 104 holds second cross-connect information for re-use. The second cross-connect information is entered into the second register 104 by a CPU (central processing unit) 107 when necessary. The first cross-connect information may also be pre-entered into the first register 103 by the CPU 107. The selector 105 selects either of the first and second registers 103 and 104 according to line usage when no network failure is detected in the failure detector 102. When a network failure is detected, on the other hand, the selector 105 is forced to select the first register 103 for PPS ring even if the second register 104 has been selected so far for re-use. The time slot assigner 106 makes time slot assignment (TSA) for a main signal received from another station via the path overhead detector 101, a main signal to or from the associated terminal of the corresponding station and a main signal to another station on the ring, depending on the state of the selector 105, thereby implementing proper cross-connects.

The time slot assigner 106 performs operations of passing through, dropping or adding on each time slot. In the passing through operation, the signal on a specific time slot of the data signal 108 received from another station via path overhead detector 101 passes through the time slot assigner 106 and is output from the time slot assigner 106 to another station on the ring. In the dropping operation, the signal on a specific time slot of the data signal 108 received from another station via path overhead detector 101 is extracted from the specific time slot by the time slot assigner 106 and outputted from the time slot assigner 106 to the associated terminal of the corresponding station. As a result of the dropping operation, the time slot which had been assigned to the extracted signal becomes empty. In the adding operation, the data signal 108 inputted from the associated terminal is assigned to the empty time slot on the data signal 108 by the time slot assigner 106 and outputted from the time slot assigner 106 to another station on the ring.

Figure 6:
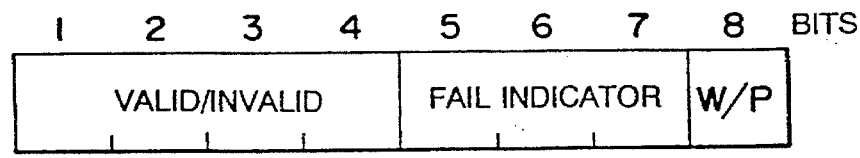
FIG. 6 illustrates an overhead byte used in the PPS ring network of FIG. 4.

FIG. 6 shows an example of a path overhead byte. In its first through fourth bit positions is placed valid/invalid information indicating whether information contained in the path overhead byte is valid or invalid (for example, "1001" could indicate that the information is valid; the others could indicate invalid). In the fifth to seventh bit positions is placed a fail indicator which indicates the failure state of the working path (for example, "111" could indicate the occurrence of a failure in the working path; "000" could indicate that the working path is normal). In the eighth bit position is placed path information indicating whether the path that carries the overhead byte is the working path or the protection path (for example, "0" could indicate the working path; "1" could indicate the protection path).

The operation of the PPS ring thus arranged will be described hereinafter.

To effect a path switch during re-use of the network element, each of the stations 51 to 56 is allowed to have two pieces of cross-connect information for configuring ring paths, i.e., first and second cross-connect information. As described above, the first cross-connect information, which is information for the normal PPS ring mode, is used first to configure PPS ring paths. The second cross-connect information, which is valid information for the protection path only, is used to configure a path for re-use as a second working path.

A path overhead byte carrying various information is passed via a PPS ring path based on the first cross-connect information. Note that one available byte (for example, G3 byte) in path overhead on the SPE (synchronous payload envelope) of SONET/SDH is used as that path overhead byte.

The path overhead byte is received by the POH detector 101 followed by the time slot assigner 106, which performs cross-connect. Switching between the first and second cross-connect information is made on the basis of information contained in the overhead byte. The overhead byte is outputted, passed through or dropped with the signal 108 in accordance with the first cross-connect information as described above. The overhead byte information is then generated in a network element in which a signal 108 is added.

The overhead information is transmitted in accordance with the first cross-connect information. Which of the working path and the protection path is to be used is determined in accordance with the path state information bit in the path overhead byte. If it is the working path, the first cross-connect information is made fixed. If it is the protection path and both the first and second cross-connect information have been set, then switching is made.

The switching is made in the following manner. The working path is normally set up to allow main-line transmit data to flow, and the counter-rotating protection path is next set in the first register 103. At this point, the main-line transmit data also flows through the protection path. Subsequently, in order to utilize the protection path effectively, a re-use path is set in the second register 104 on the protection side. Then, the overhead byte is detected to monitor the state of the working path. If it is normal, the second register 104 is selected to set up a path. If it is abnormal, the first register 103 is selected to set up a path. Thus, the network is normally placed in the re-use state. If a failure occurs in the working path, then the network will enter the PPS ring state. In this case, the received overhead is updated on the basis of a recognized pattern in the overhead byte, thereby circumventing the danger of abnormal switching.

The six-station ring shown in FIG. 4 will now be described more specifically.

FIG. 4 shows the normal state in which the protection path is used as a re-use path for a sub-line. A main line 40 extends from station 51 through station 52 to station 53, and a sub-line 42 extends from station 56 to station 55 and from station 55 to station 54. In this case, an overhead byte NW indicating the normal/working path and an overhead byte NP indicating the normal/protection path are transferred as shown in FIG. 4.

Figure 7:
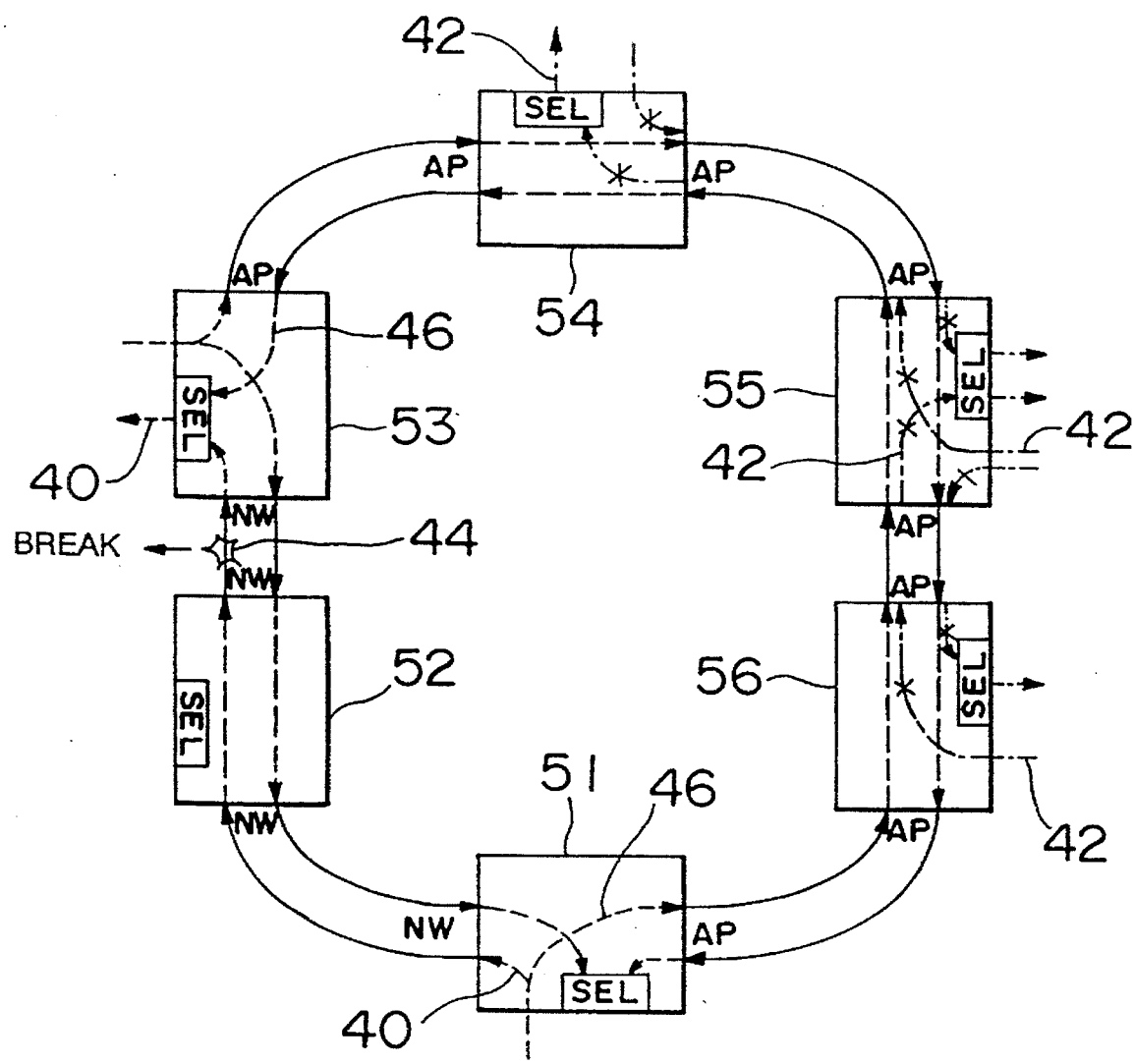
FIG. 7 is a diagram for use in explanation of the operation of the PPS ring network when there is a failure therein.

FIG. 7 shows the state in which a failure or break 44 has occurred in the working path 40. In this case, the protection path can no longer be used as the re-use or second working path 42. The original protection path 46 substituted for the failed working path, thereby permitting the network to be saved.

Suppose that, as shown in FIG. 7, the break 44 has occurred in the working path between stations 52 and 53. Then, the main line extends from station 51 through stations 56, 55 and 54 to station 53 on the protection path 46, and no sub-line for re-use is available. In this case, the overhead byte NW indicating the normal/working path and the overhead byte AP indicating the abnormal/protection path are transferred as shown in FIG. 7. In this way, the effective utilization of the PPS ring lines can be achieved.

That is, when there is no failure on the ring, the re-use system can be used, which effectively utilizes twice as many paths as the present state. Moreover, the main line can be used in the usual way. Furthermore, a recognition pattern is contained in a switching instruction transferring overhead byte, preventing wrong switching from being made.

The PPS ring configuration of the present invention is not restricted to the embodiments described above. For example, the ring may comprise a different number of stations from the embodiments. Even if each network element is arranged in a different way from the arrangement of FIG. 5, it has only to be arranged to include substantially the same facility as the switching units shown in FIG. 3.

It is apparent that, in this invention, a wide range of different working modes can be formed based on the invention without deviating from the spirit and scope of the invention.

What is claimed is:

1. A path protection switched network system comprising:
   a plurality of network elements interconnected in a path protection switched ring configuration by a plurality of lines, wherein
   each network element has:
   first cross-connect setup means for setting up on said lines a first cross-connect for said path protection switched ring which uses a primary working path and a protection path, said primary working and protection paths transferring primary signals in one direction and in the other direction, respectively;
   second cross-connect setup means for setting up a second cross-connect for re-use of said protection path as a secondary working path for transferring secondary signals on said protection path; and
   transmission control means responsive to the presence or absence of a failure in said primary working path for switching between said first and second cross-connect setup means in order to force said first cross-connect to be established in the event of a primary working path failure, thereby allowing data transmission of said primary signals and not said secondary signals over said protection path when said primary working path fails.

2. The network system according to claim 1, in which said transmission control means includes:
   information setup means for generating and sending path information indicating either a primary working path or a protection path and failure information indicating the presence or absence of a failure to be transmitted over said lines as part of said primary signals: and
   information detecting means for detecting said path information and said failure information from said primary signals and selecting between said first and second cross-connects.

3. The network system according to claim 2, in which said information setup means includes means for placing said path information and said failure information in a predetermined empty area in path overhead of said primary signals.

4. The network system according to claim 2, in which said information setup means further includes means for allowing identification information indicating that transmit data is valid or invalid to be transmitted over said lines, together with said path information and said failure information.

5. The network system according to claim 4, in which said information setup means further includes means for placing said identification information, said path information and said failure information in a predetermined empty area in path overhead of transmit data.

6. The network system according to claim 1, in which said first and second cross-connect setup means respectively include a first register for storing first cross-connect information for PPS ring and a second register for storing second cross-connect information for re-use.

7. A failure recovery method for a path protection switched network comprising a plurality of network elements interconnected by a plurality of lines, said method comprising the steps of:
   setting up, in each network element, a first cross-connect for a path protection switched ring using a primary working path and a protection path which are adapted to respectively transmit primary data in one direction, and in the other direction, respectively, and a second cross-connect for re-use of said protection path to transmit secondary data;
   transmitting path information, indicating said primary working path or said protection path, and failure information indicating the presence or absence of a failure, together with said primary data, on a line of said path protection switched ring network; and
   setting up, in response to said failure information, said second cross-connect only when there is no failure in said primary working path, and setting up said first cross-connect thus forcing said protection path to transmit primary data and not secondary data when there is a failure in said primary working path.

8. The method according to claim 7, further comprising the step of generating and sending identification information indicating whether said primary data is valid or invalid to be transmitted on said lines together with said primary data and preventing, in response to said identification information, a receiving network element from receiving said secondary data when there is a failure in said primary working path.

* * * * *